Patented Nov. 16, 1943

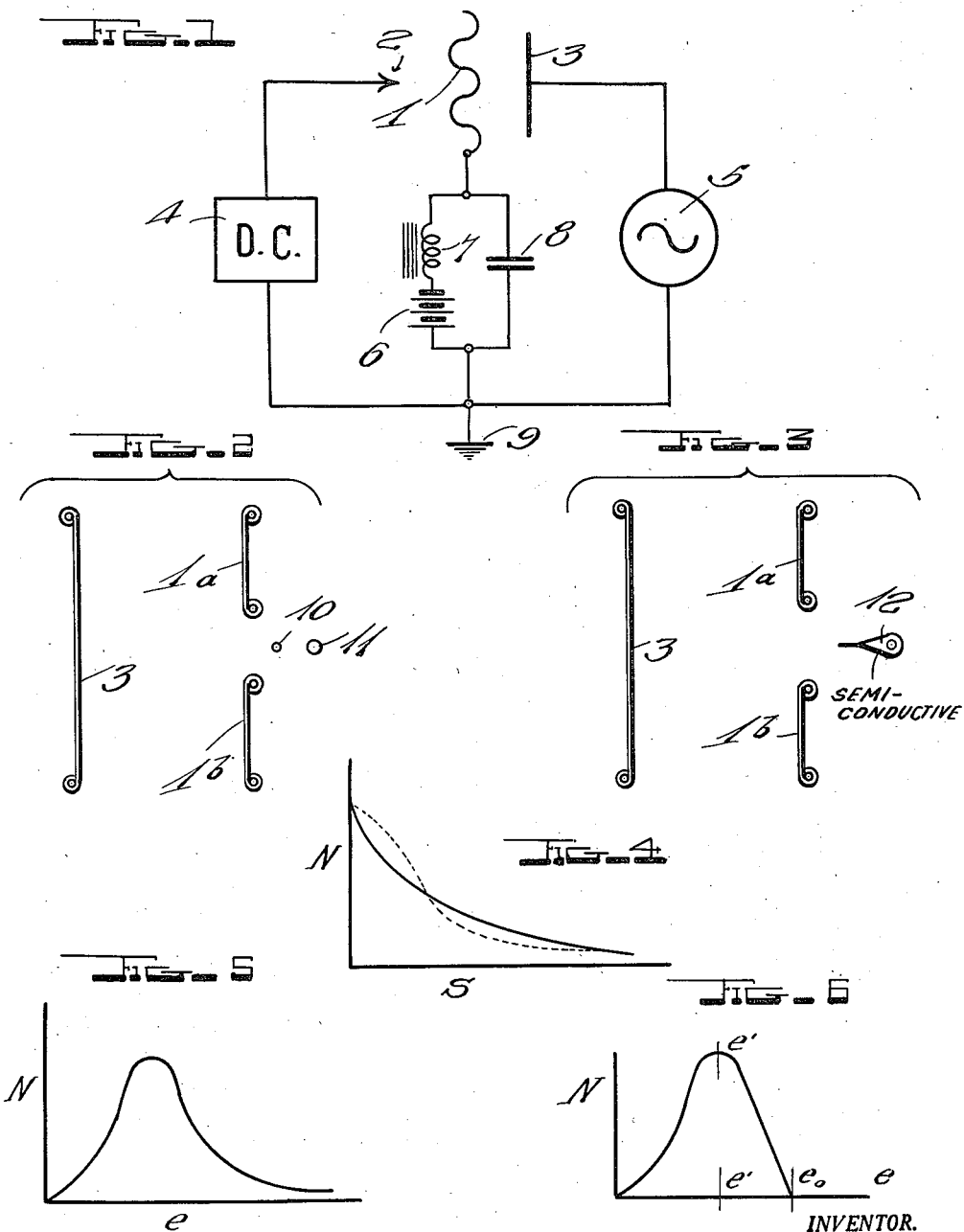

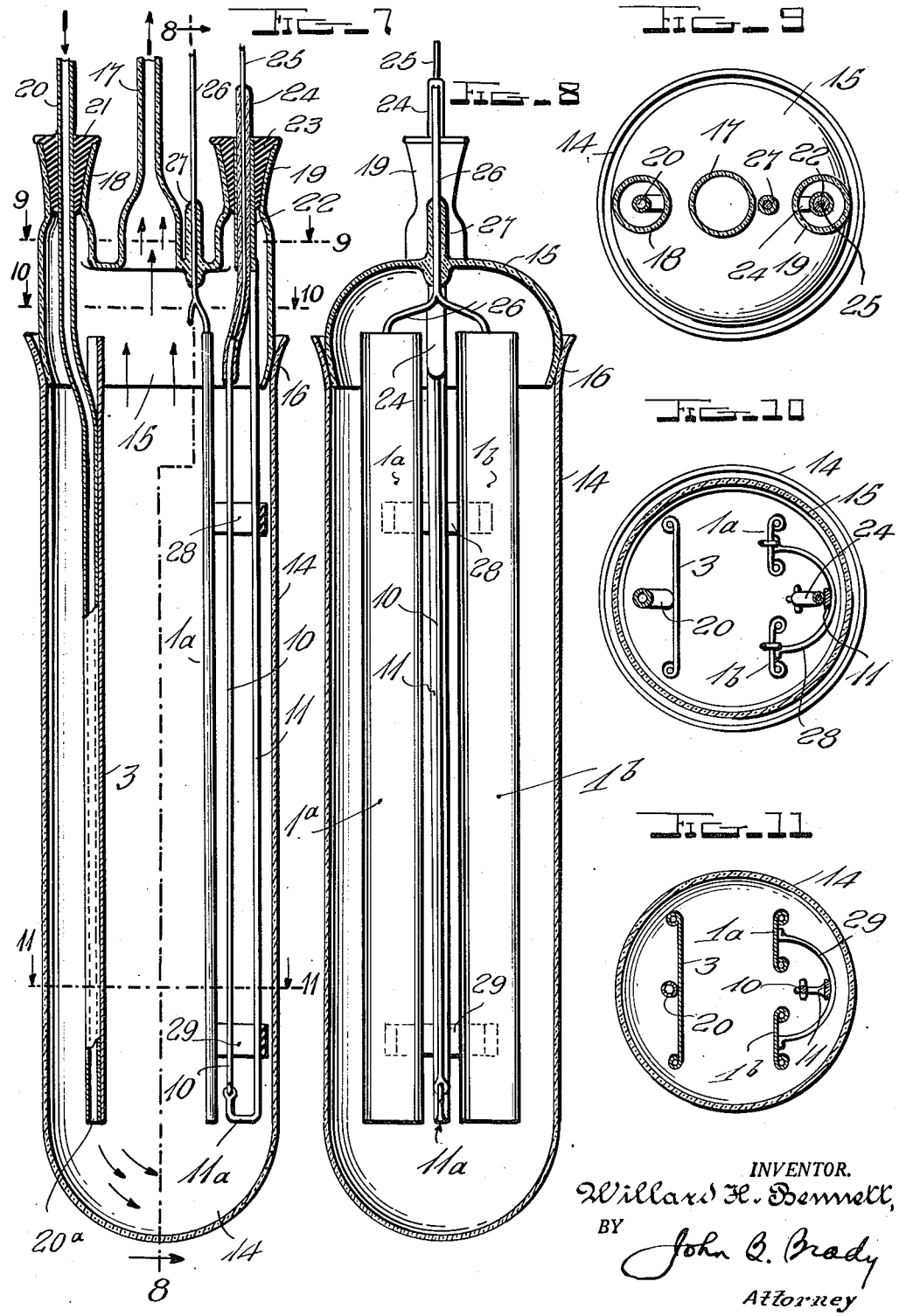

2,334,377

UNITED STATES PATENT OFFICE 2,334,377

ELECTRIC DISCHARGE SYSTEM

Willard H. Bennett, Newark, Ohio, assignor, by mesne assignments, to Games Slayter, Newark, Ohio Application January 27, 1940, Serial No. 316,045

2 Claims. (Cl. 204—312)

My invention relates broadly to electric discharges in atmospheres of reactant gases, and more particularly to an electric discharge system and apparatus for materially increasing the effectiveness of the electric discharge in promoting reactions between the reactant gases.

Ions produced in electric discharge apparatus heretofore known for aiding in chemical syntheses have velocities of the order of magnitude of thermal motion; that is, despite the electric force on the ions, the high pressures of the gases subject them to such a high rate of collision that the electrically supplied energy is rapidly dissipated, at a rate of .50 per collision. Roughly, $10^8$ collisions occur per second. In view of the high rate of energy dissipation, the chief point to consider is the necessary activation energy. If the reaction is exothermic, the activation energy can be any value from zero up; usual values lie around one volt per electron in the discharge producing ionization. On the other hand, if the reaction is endothermic, the activation energy is at least equal to the thermodynamic energy absorbed in the reaction plus, as a rule, about one volt as above.

In the case of simple direct current discharges, the necessary activation energy comes, as in thermal reactions, from collisions. At one atmosphere pressure, a molecule undergoes about $10^8$ collisions per second; as a rule, $10^4$ or $10^5$ collisions are required before sufficient activation energy is received. In the direct current discharge, however, the ions formed are swept out of the gas phase to the target or plate electrode in about $10^{-4}$ seconds; thus, there is hardly time for the storing of activation energy, and ions produced do not have a good chance to react. My invention is directed to a system and apparatus for chemical syntheses in vapor phase with provision for keeping in the gas phase ions produced by electric discharge.

One of the objects of my invention, therefore, is to provide a method for increasing the activation energy of reactants in the gaseous phase through electric discharge means by increasing the time during which collisions may occur.

Another object of my invention is to provide electric discharge means energized by alternating and direct currents for producing ions oscillating in a high voltage field and drifting slowly from emitter to plate.

A further object of my invention is to provide electric discharge apparatus for accelerating ions to more than thermal velocities for increasing the activation energy by which chemical synthesis is produced.

Still another object of my invention is to provide electric discharge apparatus for chemical synthesis in vapor phase wherein the spread in the distribution of velocities of ions is limited, for greater concentration of effect.

A still further object of my invention is to provide electric discharge apparatus for chemical syntheses in vapor phase employing an oscillatory current whereby unwanted negative ions are eliminated, positive ions and electrons are produced, and the spread of electron velocities is diminished as compared with direct current discharges.

Still another object of my invention is to provide electric discharge apparatus in which ions produced are accelerated to higher than usual velocities in a high voltage oscillatory field so that lower discharge currents are effective for promoting chemical synthesis in vapor phase, and the adverse factors attending higher discharge currents are avoided.

A still further object of my invention is to provide an electric discharge tube having discharge and target electrodes, and a special intermediate electrode for cooperation in establishing a high voltage oscillatory field with means for circulating gas through the discharge field.

Other and further objects of my invention reside in the system and apparatus hereinafter described with reference to the accompanying drawings, in which:

Figure 1 is a schematic diagram of electric discharge apparatus as employed in the system of my invention; Fig. 2 is a diagram of an electrode arrangement, in plan, adaptable to the system represented in Fig. 1; Fig. 3 is a similar diagram of a modified electrode arrangement; Figs. 4, 5 and 6 are graphical representations of certain of the operating characteristics of the electric discharge system of my invention, as hereinafter described; Fig. 7 is a vertical longitudinal sectional view, with parts shown in elevation, of an electric discharge tube of the type employed in the system of my invention; Fig. 8 is a vertical longitudinal sectional view thereof taken substantially on line 8—8 in Fig. 7; and Figs. 9, 10 and 11, are horizontal sectional views of the tube shown in Figs. 7 and 8, taken substantially on lines 9—9, 10—10 and 11—11, respectively, in Fig. 7.

The discharge from sharp points in gaseous or vapor media consisting of mixtures of chemical components which it is desired to cause to react, can be produced by the application of voltage in a considerable range of frequencies, the upper limit of which is fixed by the necessity of there being an on-time of field at the tip of the point long enough for many successive ionizations to have been produced in order to lead to the avalanche kind of charge formation characteristic of the silent discharge. This requirement is independent of whether the vapors are or are not electron-attaching, since it has been found that surge formation occurs because of the effect of electron attachment after the maturity of an avalanche.

It is therefore to be supposed that the power expended as the produce of the discharge current and the potential drop through the ionizing sheath represents the expenditure of energy in a very intense form of ionization similar in many respects to spark discharge, and that this similarity to spark discharge obtains regardless of the frequency used. While this hot-spot kind of discharge appears to be generally without great advantage in its usual form, it is adaptable in the manner hereinafter set forth to provide distinct advantages over any previously known kinds of discharge.

Referring to Fig. 1 of the drawings, which is a schematic diagram of the system of my invention, I have found that by the use of a grid 1 or its equivalent, interposed between a discharge electrode 2 and a so-called target or plate electrode 3, it is possible to draw a relatively very small discharge current on D. C. supplied from source 4, and to cause most of this current to pass through the aperture or apertures in the grid electrode 1. A high frequency, high voltage is maintained by source 5 between the grid electrode and the plate or so-called target electrode 3 which is located beyond the grid 1 from the discharge wire 2. Superimposed on the high frequency alternating voltage between the grid and the plate, there is applied a small D. C. voltage, from a source shown as battery 6, which will cause the charge which has entered the main gap between the grid 1 and the plate 3 from the region around the discharge electrode 2 to drift slowly toward the plate 3. The oscillatory motion of the charge under the applied A. C. constitutes an A. C. current which is very much greater in magnitude than any of the D. C. currents. The collisions of these charges in the main gap can readily be maintained below avalanching conditions by suitable simultaneous adjustment of frequency, A. C. voltage, and D. C. current density, and in general will be very distinct and different from the conditions in the hot spot or hot spots at the silent discharge member.

A high frequency choke coil 7 is provided in series with battery source 6 and the combination is shunted by a by-pass condenser 8, for efficient operation. A ground connection is provided at 9 intermediate the D. C. source 4 and the A. C. source 5.

The variables under control in the system of Fig. 1 are: (1) the direct current of "trigger" electrons, which may be measured as the direct current through the target circuit—"trigger" electrons are those which initiate ionization; (2) the space charge density of trigger electrons in the gap; (3) the effective radio frequency field intensity maintained between grid and plate; and (4) the frequency of oscillation in the gap.

In Fig. 2 is shown a diagram of an electrode arrangement in which reference character 10 indicates a plain straight wire, constituting a discharge electrode, adjacent to a rod 11 which functions as a guard electrode at the same potential as the wire 10, and causes the discharge from the wire to move substantially in the direction of the space between two sectional plate elements 1a and 1b constituting the grid electrode 1. The plate electrode is shown at 3. Fig. 3 is a diagram of a similar arrangement except that the emitter at 12 consists of resistance ballasted wires from the ends of which discharge occurs.

In the main gap, that between grid and plate, if the collision cross-section for charged particles on neutral molecules is a constant, independent of the velocity of collision, the distribution factor N would vary in reference to the number of free paths S in accordance with the simple exponential function shown by the full line graph in Fig. 4, so that the energy acquired in an applied D. C. field would be distributed among the free paths according to a similar exponential function. In general, however, the collision cross-section varies with the energy of collision, so that the distribution in energies acquired by the collisions is a little different, like the curve shown with the dotted line in Fig. 4.

In general, the charged particles will recoil from each collision with more or less residual energy, so that the distribution factor N varies in reference to the energy $e$ of the charged particles as shown in Fig. 5. By use of a suitable high frequency and corresponding value of effective voltage, the on-time for a half cycle can be adjusted so that the maximum energy, $e_0$, has a value below the ionizing energy, if desired, so that the distribution in energy of the charged particles will be as shown in Fig. 6. In such distribution, the average energy of collision $e'$ could be made greater than some desired excitation energy, which would lead to rendering chemically active the molecule collided with, and yet avoid the occurrence to any considerable degree of concurrent ionizing collisions, due to the presence of any considerable concentration of colliding particles at energy greater than ionizing energy.

An example of this kind of reaction would be in an apparatus where it is desired to convert oxygen into ozone. In this case, the more economical method of generating ozone is through electronic collisions with oxygen molecules at energy of more than five volts. The ionizing potential of oxygen is 13.55 volts, so if the frequency, effective A. C. voltage, and charge density are suitably adjusted so that the maximum collision energy $e_0$ is below 13.5 volts but the average collision energy $e'$ is above 5 volts, the production of ozone is increased without sparkover of the gap. Such a discharge is entirely distinct from, and superior to all known ozonizers at present because present ozonizers all rely on spark streamers entirely for ozone production, and such streamers are relatively very wasteful of both energy and yield.

The apparatus illustrated in Figs. 7–11 embodies the electrode arrangement of Fig. 2 in an enclosure through which gases are circulated. The apparatus comprises a cylindrical body portion 14 closed at one end, and a cap portion 15 united with the body portion 14 at a sealed connection 16. The cap 15 has a central tubular projection 17 which serves as an outlet passage for gas, and opposite supporting conformations 18 and 19, the former having a tube 20 of copper, for example, secured therein by a cement seal 21, and the latter similarly having a tube 22 mounted therein by a cement seal 23, the tube 22 in turn embracing an insulation support 24 through which connector 25 extends coaxially. Connector 26 for the sectional plate electrode 1 passes through the cap 15 in sealed relation, as indicated at 27.

The copper tube 20 extends downwardly within the cylindrical portion 14 of the tube and terminates at 20a adjacent the lower end of the tube. Plate electrode 3 is mounted on the tube 20, by which connection is made to the plate, and the tube 20 also constitutes inlet means for introducing gas or vapor within the tube, as indicated in Fig. 7. Tube 22, supported at the opposite side of cap 15, mounts the rod 11 which depends coextensively with the plate 3 and has a return bend portion 11a at the lower end to which one end of the discharge wire electrode 10 is secured. The opposite end of wire 10 joins the conductor 25, through which operating potential is applied to the discharge wire 10 and the guard or reflector rod 11.

The elements 1a and 1b of the sectional plate electrodes are supported by insulating bracket members 28 and 29, which are secured at the middle to rod 11, as clearly shown in Figs. 10 and 11. Connection to the elements 1a and 1b is made through conductor 26, which is branched as illustrated in Fig. 8 to make connection to each of the elements whereby a common potential is impressed on the parts of the sectional plate electrode 1.

The enclosure provided by portions 14 and 15 is airtight except for the tubular inlet and outlet connections 20, 17, respectively. The gas or gas mixture to be treated is introduced through tube 20 at the bottom of the enclosure, whence it passes upwardly in the main gap between the plate electrode and the sectional plate electrode, and out through the passage in the connection 17. The particular effect achieved in this apparatus of my invention is due to the fact that the gas is thus passed principally between the plate electrodes and to the novel arrangement for energizing these electrodes to produce a high intensity radio frequency oscillation field therebetween, as described in reference to Fig. 1. The apparatus may be operated in the discharge electrode of 4,000 volts from ground 9, a sectional plate voltage provided from source 6 of a few hundred volts from ground and at the same polarity as the discharge electrode, and a high voltage of a frequency above 100 kilocycles applied from ground to the plate electrode 3.

It will be noted in Figs. 7–11 that the apparatus is constructed so that the cylindrical portion 14 can be immersed in cooling media for condensation of products of the chemical synthesis, if desired, and it will be further noted that such condensation would occur on the wall of the portion 14 outside the region of discharge so that the products would not be disintegrated by the action of the discharge. For recovery of such products the seal at 16 between the enclosure portions 14 and 15 may be made demountable so that the portion 14 may serve as a container for the product, at least temporarily.

The production of ozone by the apparatus of my invention has been mentioned above by way of example. The mechanics of the synthesis of ozone from oxygen have been investigated with the conclusion that the reaction proceeds best when the oxygen molecule $O_2$ is reduced to the atomic form $O + O^-$ by the effect of electron collision where the electron has an energy of more than 5 volts; electrons of energy more than 5 volts are found to attach themselves to the oxygen molecule to form an unstable negative ion $O_2^-$. With the oxygen molecule reduced to atomic form, therefore, synthesis of ozone proceeds according to the reaction:

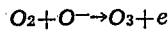

or

where $e$ represents the initial electron regenerated but with energy decreased by the more than five volts expended. Good efficiency is obtained as each electron is subject to multiple use where the total voltage through which its energy may fall is many times the more than five volts expended per collision; for each approximately five volt potential drop the same electron may be expected to collide with a molecule of oxygen.

The system and apparatus of my invention are not limited to the synthesis of ozone but may be employed in various other cases, for example; in different oxidation reactions, particularly with hydrocarbons, such as the synthesis of formaldehyde from methane; and in more direct syntheses such as ammonia from nitrogen and hydrogen, or aniline from benzene, nitrogen and hydrogen.

Electrically, the operation of the apparatus of my invention is as follows, referring principally to Fig. 1. Discharge electrode 2, being at high D. C. potential above ground and with respect to plate electrode 3, produces an electric discharge directed towards the plate electrode. With the electrode arrangement described, and with the additional electrode 1 in the same polarity as the discharge electrode 2, preferably negative, the discharge current passes substantially between the portions of the additional electrode 1 into the gap between the electrode 1 and plate 3. At this stage, the high frequency oscillatory field between electrodes 1 and 3, produced by the voltage from source 5 takes effect and sets the electrons and ions into oscillatory motion in the gap between the electrodes 1 and 3. This increased activity of the electrons and ions delivered from the discharge produces the increased chemical reactivity in the medium between electrodes 1 and 3, the primary electron current from electrode 2 being utilized principally to supply electrons and ions to the main gap through the space between the elements of the additional electrode 1.

At the same time that the high frequency oscillatory field is effective, there is also in force the D. C. voltages of sources 4 and 6 which tend to direct the discharge current through the oscillatory field. The resultant motion of the ions and electrons produced is oscillatory but with a drift toward the plate 3. The drift, however, is such that the ions and electrons remain in the gap for a longer period of time than has heretofore been the case, and, under the influence of the high frequency oscillatory field, produce a higher measure of activation energy in the medium, for chemical synthesis.

While I have described my invention in certain preferred embodiments, various modifications may be made, as will be understood, and no limitations upon my invention are intended thereby, but only such as are imposed by the scope of the appended claims.

What I claim as new and desire to secure by

Letters Patent of the United States is as follows:

1. An electric discharge system for chemical synthesis in vapor phase which comprises a plate electrode and a sectional plate electrode disposed in spaced and substantially parallel arrangement in the vapor medium, an electric discharge electrode mounted adjacent said sectional plate electrode for directing an electric discharge current into the gap between said plate electrodes, means for energizing said discharge electrode at a direct potential with respect to ground for producing an electric discharge in the vapor medium, and means for applying a high frequency high voltage between said plate electrode and said sectional plate electrode for establishing an oscillatory field effective to increase the activation energy and the chemical reactivity of the vapor medium, the last said means having a connection to ground for completing a circuit through said energizing means whereby the discharge current produced by emission at direct potential passes through an oscillatory phase in the gap between said plate electrodes.

2. An electric discharge system as set forth in claim 1 and including means for energizing said sectional plate electrode in the same polarity as said discharge electrode and the plate electrode in opposite polarity, for establishing a static electric field for inducing a drift of ions and electrons in the discharge current from said oscillatory field towards said plate electrode.

WILLARD H. BENNETT.